United States Patent
Pomme

(10) Patent No.: US 9,469,407 B2
(45) Date of Patent: Oct. 18, 2016

(54) FLUID TEMPERATURE CONTROL INSTALLATION FOR ROTORCRAFT, ASSOCIATING A SYSTEM FOR COOLING A POWER PLANT WITH A SYSTEM FOR HEATING A CABIN

(71) Applicant: AIRBUS HELICOPTERS, Marignane (FR)

(72) Inventor: Vincent Pomme, Les Pennes Mirabeau (FR)

(73) Assignee: Airbus Helicopters, Marignane (FR)

( * ) Notice: Subject to any disclaimer, the term of this patent is extended or adjusted under 35 U.S.C. 154(b) by 968 days.

(21) Appl. No.: 13/741,551

(22) Filed: Jan. 15, 2013

(65) Prior Publication Data

US 2013/0340459 A1    Dec. 26, 2013

(30) Foreign Application Priority Data

Jan. 24, 2012 (FR) .................................... 12 00191

(51) Int. Cl.
| | |
|---|---|
| *F25B 27/00* | (2006.01) |
| *B64D 13/08* | (2006.01) |
| *B64D 13/06* | (2006.01) |
| *F25B 9/06* | (2006.01) |
| *F25B 19/02* | (2006.01) |

(52) U.S. Cl.
CPC .............. *B64D 13/08* (2013.01); *B64D 13/06* (2013.01); *B64D 2013/0648* (2013.01); *B64D 2013/0674* (2013.01); *F25B 9/065* (2013.01); *F25B 19/02* (2013.01); *F25B 2309/005* (2013.01); *Y02T 50/56* (2013.01)

(58) Field of Classification Search
CPC ...... B64D 13/08; B64D 13/06; Y02T 50/56; F25B 9/065; F25B 19/02; F25B 2309/005
USPC ......................................................... 165/123
See application file for complete search history.

(56) References Cited

U.S. PATENT DOCUMENTS

| | | | |
|---|---|---|---|
| 2,774,552 | A | 12/1956 | Glad |
| 7,334,422 | B2 | 2/2008 | Zywiak |
| 8,042,354 | B1 | 10/2011 | Dziorny |
| 2004/0261428 | A1 | 12/2004 | Murry |
| 2009/0260387 | A1 | 10/2009 | DeFrancesco |

FOREIGN PATENT DOCUMENTS

EP    1790568 A1    5/2007

OTHER PUBLICATIONS

Search Report and Written Opinion; Application No. FR 1200191; dated Sep. 5, 2012.

*Primary Examiner* — Orlando Aviles Bosques
(74) *Attorney, Agent, or Firm* — Brooks Kushman P.C.

(57) ABSTRACT

A fluid temperature control installation for a rotorcraft, the installation comprising a system for cooling a main transmission (3) and a system for temperature control of the ambient air (32) of a cabin (16). A heat exchanger (8) is fitted with a bladeless ventilator (9). A source air stream (11) generated by an accessory compressor (5) driven by the main transmission (3) passes through the heat exchanger (8) where it takes heat. The source air stream (11) is distributed selectively to the bladeless ventilator (9) to generate a cooling air stream (13) passing through the heat exchanger (8), and/or is distributed to the cabin (16) after passing through the heat exchanger (8) in order to heat the ambient air (32) of the cabin.

16 Claims, 2 Drawing Sheets

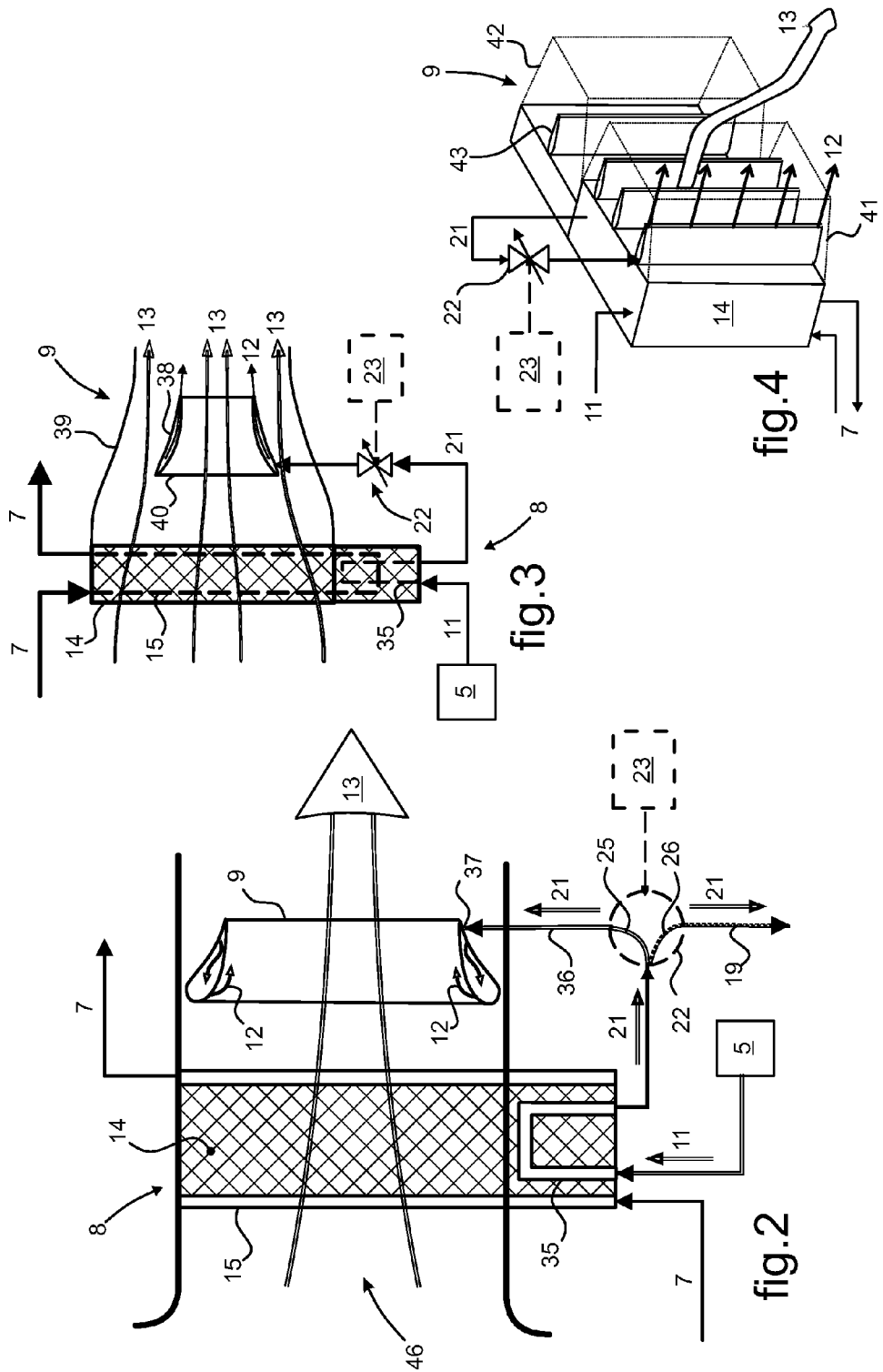

FLUID TEMPERATURE CONTROL INSTALLATION FOR ROTORCRAFT, ASSOCIATING A SYSTEM FOR COOLING A POWER PLANT WITH A SYSTEM FOR HEATING A CABIN

CROSS REFERENCE TO RELATED APPLICATIONS

This application claims priority to French patent application No. FR 12 00191 filed on Jan. 24, 2012, the disclosure of which is incorporated in its entirety by reference herein.

BACKGROUND OF THE INVENTION (1) Field of the Invention

The present invention lies in the field of fluid temperature control installations on board aircraft, and more particularly rotorcraft. Taken generally, such installations comprise a variety of systems for applying temperature control to a fluid, in particular a system for cooling a main power plant of the rotorcraft and a system for temperature control of air inside the cabin of the rotorcraft.

(2) Description of Related Art

Aircraft are fitted with a fluid temperature control installation that is made of various systems for controlling the temperature of a fluid, which systems are dedicated to respective particular functions. Overall, the installation should be considered as grouping together various circuits for conveying a fluid that is subjected to temperature control. The ways in which temperature control systems are organized depend on their respective functions and on the natures of the fluids that each of them uses.

Aircraft, and in particular rotorcraft, have a main power plant providing lift and/or propulsion. Such a power plant comprises in particular at least one engine member engaged with a main gearbox that is driven by the engine member. The main gearboxes are used for driving both propulsive members of the aircraft and also accessories with which the aircraft is fitted. Specific transmission systems for driving various pieces of equipment of the aircraft may be driven by the main gearbox or by secondary gearboxes that are respectively associated therewith, or indeed by respective individual motor members that are powered electrically from the network on board the aircraft.

More particularly with rotorcraft, the main power plant is used for driving one or more rotors of the rotorcraft and possibly also propulsive propellers in hybrid helicopters. The rotors and/or propulsive propellers are driven in rotation by the main gearbox so as to achieve at least lift if not also propulsion and/or guidance of the rotorcraft. By way of example, the engine member may be a diesel engine or a turbine engine, or any other engine member suitable for developing power for driving at least the rotors and/or the propulsive propellers in rotation, and possibly also accessories or equipment of the rotorcraft.

The gearbox should be considered as being a member of the aircraft that is interposed between the engine member and a member that is to be driven, without that specifying the particular organization and/or function of the member that is to be driven or the ways in which the gearbox is included in the transmission system of the rotorcraft. Gearboxes, and in particular main gearbox (MGB), are subjected in operation to temperature rises that need to be controlled. It should be considered that gearbox covers any member that is subjected to drive and that needs its temperature to be controlled.

For this purpose, the fluid temperature control installation comprises a system for cooling one or more gearboxes. Such a cooling system comprises at least one closed circuit for circulating a fluid that is to be cooled, usually in the liquid state, between the gearbox and a heat exchanger. The fluid for cooling is commonly a lubricant that flows from the gearbox to the heat exchanger in order to lower the temperature of the fluid for cooling, and then from the heat exchanger to the gearbox in order to cool the gearbox.

The heat exchanger is commonly arranged as a radiator or an analogous member for exchanging heat between a stream of air and the fluid for cooling. The heat exchanger comprises an internal circuit for passing a flow of the fluid for cooling and a heat exchange structure of the type having fins or the like for exchanging heat with a stream of cooling air. The heat exchanger has an airflow generator member for generating a flow of cooling air that passes through the heat exchange structure. Such an airflow generator member is commonly arranged as a propeller type fan that, under motor drive, serves to generate a stream of air and to drive the stream of air through the heat exchanger.

Those kinds of organization for a system for cooling a gearbox are conventional in the general field of vehicles. The use of such cooling systems for a rotorcraft present drawbacks, in particular in terms of energy losses and difficulties associated with safe installation on board the rotorcraft.

For example, concerning the airflow generator member, the energy needed for driving it is defined as being constant with respect to optimized needs for cooling the heat exchanger. In a rotorcraft in particular, such optimized needs are defined relative to a situation in which the rotorcraft is performing hovering flight and/or a situation in which temperatures outside the rotorcraft are high. This leads to energy being lost in other situations in which the rotorcraft might be placed, given that the airflow generator member is driven so as to consume a constant level of power. This leads to significant loss of energy in a cruising flight situation and/or in a situation where temperatures outside the rotorcraft are low. In such situations, the cooling needs of the main transmission do not require power to be consumed at such a constant level.

It is also desirable for the airflow generator member of the cooling system to be driven by power taken from the main transmission so as to avoid taking electricity from the on-board electricity network and so as to avoid lengthening the closed circuit considerably. The proximity between the airflow generator member and the main gearbox makes it difficult to install the airflow generator member in a zone of the rotorcraft that houses power members, with constraints in terms of safety and making the operation of the airflow generator member reliable.

Aircraft also include a cabin in which the air needs to be temperature-controlled. The term "cabin" is used to cover any space in the aircraft for accommodating people and/or cargo. Controlling the temperature of cabin air seeks to provide comfort for the passengers and/or to preserve cargo, and relates in particular to a function of heating, ventilation, and/or air conditioning the cabin.

For this purpose, the fluid temperature control installation includes a system for temperature controlling the ambient air in the cabin. The temperature control of cabin air involves in particular an open circuit for conveying and/or applying temperature control to various streams of air, having a plurality of air circuits in association.

In one embodiment, the system for temperature controlling cabin air comprises one or more independent heating, ventilation, and/or air conditioning devices. Such independent devices are powered electrically from the on-board network and they are located inside the cabin.

In a more complex embodiment, the cabin air temperature control system advantageously takes advantage of a heat source coming from the main power plant for heating ambient air in the cabin. Such a source provides heat that is extracted in particular from a main compressor of the main power plant, specifically when the engine member is a turboshaft engine. In such an embodiment, the cabin air temperature control system has a plurality of air circuits distributed over the rotorcraft.

A first air circuit is a circuit for taking hot air from the main compressor to at least one air temperature control device. The first air circuit has one or more ducts for conveying hot air from the main compressor to the air temperature control device placed as close as possible to the cabin.

A second air circuit is a circuit for taking fresh air by force from outside the rotorcraft and for conveying the fresh air that has been taken to the air temperature control device. Fresh air is taken using an airflow generator member placed inside the second air circuit. Such an airflow generator member is commonly of the type arranged as a propeller fan that is electrically powered from the on-board network of the rotorcraft. The second air circuit is advantageously used for ventilating the cabin, by being in air-flow communication with an auxiliary air circuit dedicated to this function. The auxiliary air circuit admits outside fresh air from the second air circuit directly into the cabin.

The air temperature in the cabin is controlled by performing selective mixing within the air temperature control device between outside fresh air and hot air coming from the main compressor. The air temperature control device includes an air mixer having an ejector for ejecting the hot air from the first air circuit, and an opening for admitting fresh air from the second air circuit. Air temperature control means achieve selective admission of hot air and of outside fresh air into the mixer as a function of requirements for moderate-temperature air that is exhausted from the air temperature control device to the cabin.

The use of various cabin air temperature control systems presents drawbacks, in particular in terms of energy losses, sound nuisance, and/or difficulties associated with installing such systems safely in the rotorcraft.

For example, concerning energy losses, the independent heating, ventilation, and/or air conditioning devices consume a large fraction of the electrical energy of the rotorcraft, which should be avoided.

Also by way of example, for air temperature control systems using hot air produced by the main power plant, these lead in particular to sound nuisance and to difficulties of safe incorporation in the rotorcraft.

The sound nuisance stems from the hot air ejector for ejecting hot air from the main compressor and leading into the air mixer. Such sound nuisance stems from the expansion of the compressed hot air that is released into the mixer. Such a drawback is known, and reference may be made to document U.S. Pat. No. 6,139,423 (Sikorsky Aircraft Corp.) that proposes a solution for attenuating such sound nuisance.

Safe incorporation of ducts for conveying hot air from the main compressor to the temperature control device is difficult. Such ducts extend along the fuselage of the rotorcraft and account needs to be taken of the high temperature of the air that they convey in order to ensure that the ducts are installed safety in the rotorcraft.

In general, it is found that the fluid temperature control installations on board aircraft, in particular rotorcraft, need to be improved, in particular in terms of energy losses, of the safety of their installation, and/or in terms of any sound nuisance to which they might lead. Such installations also need to be improved by simplifying their structure and their modes of operation as much as possible, without affecting their effectiveness or their safe installation on board the rotorcraft. It is also desirable to optimize reduction in the cost of obtaining them and installing them on board the aircraft, and also their maintenance costs.

BRIEF SUMMARY OF THE INVENTION

An object of the present invention is to provide a fluid temperature control installation for an aircraft, in particular a rotorcraft, that comprises overall a plurality of fluid temperature control systems. Such an installation comprises in particular at least one system for controlling the temperature of the air inside the cabin of the rotorcraft and at least one cooling system by circulating a fluid for cooling inside a closed circuit. The cooling system serves to cool at least one member for cooling, in particular a gearbox, and more particularly for cooling a main gearbox of a main power plant of the rotorcraft.

The object of the present invention is to provide such a fluid temperature control installation for an aircraft, in particular a rotorcraft that provides solutions to the above-specified constraints.

The present invention seeks to provide such an installation that is organized in such a manner that it consumes little energy and is of structure that is simple with a limited number of components, while also being reliable and safe.

The installation needs to be of an architecture that is easy to incorporate on board the aircraft, while reducing costs associated with operating it, with obtaining it, and with putting it into place on board the aircraft, and also in terms of the operations needed for its maintenance. It is desirable for the installation to be organized in such a manner as to enable it to operate with a variety of aircraft having their own specific characteristics, without that giving rise to major structural modifications.

The specific characteristics of various aircraft need to be taken into consideration in particular with respect to the power and the structure of their power plants, and also the operation of the accessories and equipment specifically fitted to those aircraft. Consideration should also be given to the various volumes of cabin air that need to be temperature-controlled.

More particularly, it is desirable at little cost and without major structural modification to be able to transpose the installation between various rotorcraft having specific needs in terms of fluid temperature control, both with respect to the cooling systems and with respect to the air temperature control systems included in the installation.

Still more particularly, said energy savings specific to the operation of the installation need to be obtained regardless of the specific characteristics of various types of rotorcraft on which such an installation needs to be suitable for being installed.

The present invention also provides an aircraft, in particular a rotorcraft, fitted with a fluid temperature control installation having at least one system for temperature control of air inside the cabin of the rotorcraft and at least one cooling system involving circulation of a fluid for cooling around a closed circuit.

The present invention also provides a specific fluid temperature control device that is advantageously usable by the installation and that obtains the looked-for energy savings.

The installation of the present invention is a fluid temperature control installation for an aircraft, in particular a rotorcraft. Such an installation comprises at least one cooling system for cooling at least one member for cooling, and at least one temperature control system for controlling the temperature of the air of a cabin of the rotorcraft.

The member for cooling is constituted in particular, by a main gearbox included in a main power plant of the rotorcraft. Nevertheless, it should be considered that the member for cooling may be any member of the rotorcraft that is subjected in operation to a rise in temperature that needs to be lowered.

Said cooling system comprises a closed circuit for circulating a fluid for cooling between the member for cooling and at least one heat exchanger fitted with an airflow generator member. The heat exchanger is interposed on the closed circuit by means of an internal circuit incorporated therein for passing a flow of the fluid for cooling. The heat exchanger includes a heat exchange structure through which there is passed a stream of cooling air that is generated by the airflow generator member.

The fluid for cooling flowing around the closed circuit is constituted in particular by a liquid for lubricating the member for cooling. The closed circuit conveys the fluid for cooling at least from the member for cooling to the heat exchanger and then from the heat exchanger to the member for cooling. In order to limit the overall size of the closed circuit, the heat exchanger and the airflow generator member that it includes are constrained to be located close to the member for cooling.

The heat exchange structure is of the type arranged as a structure having fins or any other analogous heat exchange structure in which a heat exchange surface area is optimized between the heat exchanger and the stream of cooling air.

Said air temperature control system comprises regulator means for regulating a stream of heating air admitted to the cabin. The air temperature control system also includes an open circuit conveying a plurality of air streams. The open circuit has a first air circuit for conveying a source air stream generated by a compressor to at least one temperature control device. The open circuit also includes a second air circuit for conveying to the cabin a said stream of heating air coming from the temperature control of the source air stream.

It should be considered that the compressor is any member for compressing a heat-transfer fluid, in particular air, without limiting its particular structure. The compressor has an air inlet that takes in air by suction and that delivers it in the compressed state into the open circuit. The opening to the outside of the open circuit causes the compressed air it is conveying to expand as it escapes from the open circuit. The source air stream is conveyed to the temperature control device via a first air circuit in order to obtain a desired temperature for the heating air by the action of the stream regulating means. The heating air comes at least in part from the source air stream, and it is admitted into the cabin via the second air circuit.

The installation of the present invention is mainly recognizable in that said airflow generator member is a bladeless ventilator including an ejecting air ramp that generates the cooling air stream from an activation air stream. The bladeless ventilator is of the type whereby a flow of an activation air stream admitted into the bladeless ventilator along at least a first ramp surface acts by the Coanda effect an air flow through the ventilator along a second ramp surface close to the first ramp surface. Said air flow forms the cooling air stream through said heat exchange structure of the heat exchanger.

Furthermore, the cooling system and the temperature control system include a group of members in common, including at least:

a) said compressor generating a stream of source air at moderate pressure and temperature. The compressor is more particularly an accessory compressor having an air inlet and driven by a drive member. The drive member is advantageously the engine member of the main power plant of the rotorcraft, with the accessory compressor being driven therefrom via the main gearbox.

The engine member may be of any structure, for example it may equally well be constituted by a diesel engine or by a turboshaft engine having a main compressor and forming part of the main power plant. It should be considered that in the approach of the present invention, it is decided not to make use of such a main compressor for constituting the compressor that is used by the air temperature control system from which the heating air stream is formed for modifying the temperature of the ambient air in the cabin.

The use of said accessory compressor makes it possible to generate a said source air stream at moderate pressure and temperature while consuming little energy, which energy is taken from the main power plant, and where appropriate independently of any compressed air requirements of a turboshaft engine included in the main power plant. As an indication to clarify the concept of "moderate" and without being limited to the specified values, the source air stream generated by the accessory compressor is raised to a relative pressure of the order of 0.5 bars to 1 bar and to a relative temperature of about 50° C., i.e. a temperature lying in the range 10° C. to 100° C., depending on the architecture of the open circuit and on the working operating capacity of the heat exchanger for the above-specified purpose.

b) Said heat exchanger, forming co-operating means for cooling the fluid for cooling and for heating, at least in part, the source air stream coming from the accessory compressor. The heating of the source air stream produces a hot air stream by taking heat from the fluid for cooling that flows through the heat exchanger. Taking heat in this way advantageously contributes to cooling the heat exchange structure and consequently to cooling the fluid for cooling.

Since the source air stream is at moderate temperature, its passage through the heat exchanger is used for cooling at least in part the fluid for cooling that is circulating in the closed circuit, and vice versa for heating said source air stream. Said temperature control device whereby the heating air stream is raised to the desired temperature is formed not only by the accessory compressor, but also by the heat exchanger used for cooling the fluid for cooling that is circulating in the closed circuit.

Potentially poor heat exchange between the cooling air stream and the heat exchanger is compensated by said heat taken by the source air stream at moderate temperature generated by the accessory compressor. Such poor heat exchange may be the result of using the bladeless ventilator that is selected because of the small amount of energy needed to make it operate. Such low energy consumption results not only in using the bladeless ventilator for forming said airflow generator member, but also in using the source air stream for forming the activation air stream for the purposes explained below.

c) A distributor valve for distributing said source air stream selectively to the bladeless ventilator by forming the activation air stream and/or to the cabin by forming said heating air stream coming from said hot air stream. Said distributor valve contributes to said regulator means for regulating the heating air stream admitted into the cabin, and it causes the source air stream to be admitted into the bladeless ventilator for activating it, either before or after being heated by the heat exchanger.

The activation air stream comes from the source air stream by inversely proportional distribution of the source air stream between the second air circuit and the bladeless ventilator. The heating air is taken from the source air stream after it has been heated by being passed through the heat exchanger. The activation air stream comes from the source air stream, which may be taken for this purpose from the first air circuit either before or after the source air stream passes through the heat exchanger in order to obtain the hot air stream.

In a preferred embodiment, the distributor valve is placed on the first air circuit at the outlet from the heat exchanger. The activation air stream comes more specifically from the hot air stream formed by the source air stream heated by the heat exchanger. Such a solution makes it possible to simplify installing the distributor valve on the first air circuit, and it enhances activation of the bladeless ventilator by means of the hot air stream.

In a variant, the distributor valve is placed on the first air circuit upstream from the heat exchanger in the flow direction of the source air stream in the first air circuit. The activation air stream comes directly from the source air stream, with only the hot air stream being used for forming the heating air stream.

It should be considered that the distributor valve is a member for distributing the source air stream in inversely proportional manner to the bladeless ventilator and/or to the second air circuit after the air source stream has passed through the heat exchanger. More particularly, and depending on the respective needs of the cooling system and of the air heat exchange system, the source air stream is distributed in inversely proportional fractions to one and to the other of the bladeless ventilator and the second air circuit. Said proportionality of the distribution of the source air stream is suitable for forming part of on-or-off distribution of the source air stream to one or the other of the bladeless ventilator and the second air circuit.

From an observation based on opposing energy needs respectively for the cooling system and for the air heat exchange system, it is, unusually, proposed to share the respective energy resources of said systems making up the installation. Such sharing of resources is organized in such a manner that precedence is given selectively either to cooling the fluid for cooling that is circulating in the closed circuit, or to heating the ambient air of the cabin.

Such shared resources make it possible to restrict the overall energy needs of the installation to the energy needed for driving the accessory compressor. Furthermore, the energy needs of the accessory compressor are limited to producing a source air stream at moderate temperature and pressure. The source air stream is used for selectively feeding the second air circuit and the airflow generator member, which is selected to be in the form of a bladeless ventilator having no power supply resources of its own and for which the activation stream comes from the source air stream, and preferably more specifically from the hot air stream.

The heating air stream is conveyed to the cabin via ducts extending along the fuselage of the aircraft. Such ducts extend to the cabin from the heat exchanger, which is close to the member for cooling, and in particular the main gearbox from which the accessory compressor is advantageously driven. The temperature of the heating air is moderate in terms of safety conditions relating to conveying it along the fuselage, thus making it easier to install the ducts safely.

The pressure of the heating air is also moderate, thereby limiting the sound nuisance generated by the expansion of the heating air stream. Such expansion is likely to take place inside the cabin without constituting a significant source of sound nuisance. Such expansion is also likely to take place within the second air circuit before the heating air stream escapes from the second air circuit into the cabin.

The architecture of the installation includes a limited number of components, and it is easily adapted to any rotorcraft including a variety of rotorcraft having different specific requirements, in which the respective needs of the cooling system and of the air temperature control system are likely to vary significantly.

More particularly, the distributor valve is a member for temperature control fluids selectively between heating the ambient air of the cabin and cooling the fluid for cooling. The notion of a temperature control member specific to the distributor valve should be considered with respect to the source air stream deliveries induced by operating the distributor valve. Inversely proportional amounts of the source air stream are thus delivered respectively to the second air circuit and/or to the bladeless ventilator. It should be considered that the distributor valve advantageously contributes both to said regulator means for regulating the heating air stream and to means for regulating the temperature of the fluid for cooling.

Operation of the distributor valve is under the control of control means that may equally well be manually controlled and/or automatically controlled.

Operation of the distributor valve is preferably automatic, while leaving the pilot of the aircraft free to act via a manual control on the management of the cooling of the member for cooling and/or on the cabin air temperature control. It should be considered that the installation preferably includes both automatic control and manual control over the distributor valve, either of which can be used, and with authority being given to manual control.

The control means move the distributor valve between two modes of operating the installation that are alternatives or conversely complementary. Depending on the mode of operation, operating the distributor valve causes respective inversely proportional quantities of the source air stream to be distributed to the bladeless ventilator and/or to the second air circuit.

A first mode of operation corresponds to a cabin temperature control mode in which a major quantity or even all of the source air stream is distributed to the cabin after being heated by the heat exchanger.

A second mode corresponds to a cooling mode in which a major quantity, or even all, of the source air stream is distributed to the bladeless ventilator, either before or preferably specifically after the source air stream has been heated by the heat exchanger.

The use of the automatic control means for controlling the distributor valve depends in particular at least on means for measuring the temperature of the fluid for cooling, on means for measuring the temperature of the ambient air inside the cabin, or indeed on means for measuring the temperature of the source air stream.

The heat exchanger is organized in particular as a member for dual heat exchange member. A first exchange of heat is performed between the fluid for cooling and the cooling air stream. A second heat exchange is performed between the fluid for cooling and the source air stream.

More particularly, said heat exchange structure is in air-flow communication with an admission opening for outside air from which the cooling air stream comes. The fluid for cooling flows through the heat exchanger via a first internal circuit incorporated therein. The heat exchange structure has a second internal circuit incorporated in the heat exchanger passing therethrough, which second circuit has a channel of the first air circuit conveying the source air stream through the heat exchange structure to form the hot air stream that is maintained in the compressed state.

In a specific approach of the present invention, the installation has a heat exchange device structured from said group of common members. Such a heat exchange device comprises in particular a said heat exchanger having a said heat exchange structure, means for taking heat, and a first internal circuit for conveying a flow of a fluid for cooling that is formed by the fluid conveyed by the first circuit.

Such a heat exchange device presents the feature of a particular organization of the means for taking heat, that associate:

a second internal circuit for passing a flow of a heat-transfer fluid coming from the source air stream generated by a compressor, in particular an accessory compressor; and a said bladeless ventilator having means for admitting an activation air stream coming from the air source stream. The air source stream is preferably taken at the outlet from said second internal circuit, or else upstream from the heat exchanger in the flow direction of the source air stream in the first air circuit.

Preferably, the activation air stream admission means comprise a regulated admission valve for regulating admission of the source air stream, and preferably of the hot air stream, to the bladeless ventilator. The admission valve is formed in particular by said distributor valve, with advantage being taken of the regulation of the admission of hot air to the bladeless ventilator to make use, where necessary, of the remaining hot air after the bladeless ventilator has been fed.

In general terms, the heat-transfer fluid flowing inside the first air circuit is in the gaseous state, at the latest on entering into the bladeless ventilator where the heat-transfer fluid in the gaseous state forms the activation air stream. The heat-transfer fluid is constituted in particular by a gas, specifically air, that is generated by any member for driving a flow of heat-transfer fluid within a circuit.

In the specific circumstance of the heat exchange device proposed by the present invention being used, such a member for driving a flow of the heat-transfer fluid is constituted by the accessory compressor.

The bladeless ventilator advantageously comprises at least one module having at least one air ejector. The air ejector comprises in particular an opening for admitting the activating air stream and at least one first ramp surface for guiding the activation air stream. Guiding the activation air stream along the first ramp surface acts by the Coanda effect to entrain a flow of outside air along at least one second ramp surface, with said cooling stream being derived from that flow.

The air ejector is of overall shape that may equally well be conical or elongate. In an embodiment, the air ejector is generally conical in shape, said ramp surfaces being formed respectively by concentric walls in the form of conical surfaces of revolution. In another embodiment, the air ejector is generally elongate in shape, said ramp surfaces extending substantially in parallel planes.

In a particular embodiment, the bladeless ventilator comprises a plurality of juxtaposed independent modules. Each module comprises a housing that contains at least one elongate air ejector, and otherwise housing a plurality of elongate air ejectors arranged in parallel inside the housing. Such an arrangement for the bladeless ventilator makes it easy to adapt to a heat exchange structure of any size, by juxtaposing a corresponding number of modules. These provisions make it easier to adapt the capacity of the heat exchanger to the cooling needs of the fluid for cooling that circulate in the closed circuit, and more particularly to the size of the heat exchange structure as determined by the needs specific to the aircraft.

In particular, the air inlet of the accessory compressor is in air-flow communication with a third air circuit of the open circuit. In a preferred embodiment, the third air circuit has a selection valve for selecting suction of an admission air stream by the accessory compressor. Said selection valve distributes a stream of ambient air taken from the cabin and/or a stream of air from outside the cabin in inversely proportional quantities to the accessory compressor.

It should be considered that the selection valve advantageously forms part of said regulator means for regulating the heating air stream, with operation of the selection valve being under the control of said control means.

The accessory compressor is advantageously driven from the main gearbox of the main power plant of the aircraft, in particular a rotorcraft.

In subsidiary manner, the open circuit includes a ventilation circuit having an admission for delivering outside fresh air to the cabin.

Also in subsidiary manner, the cabin temperature control system comprises at least one independent cabin air conditioner module that takes ambient air from the cabin and cools it. Such an independent module is structurally limited to the air conditioning function, and for example it incorporates one or more Peltier effect thermoelectric members that generate cold air from a stream of outside air and/or from the ambient air taken from within the cabin.

The ventilation circuit and the independent air conditioner module are separate from the means used for generating the heating air stream. The ventilation circuit and the independent air conditioner module are more particularly independent of the first air circuit, of the second air circuit, and of the third air circuit. The ventilation circuit and the means for cooling the cabin, formed by one or more of said independent air conditioner modules, may be freely installed individually in the aircraft.

The present invention also provides an aircraft, in particular a rotorcraft, fitted with a fluid temperature control installation as described above.

BRIEF DESCRIPTION OF THE SEVERAL VIEWS OF THE DRAWINGS

Embodiments of the present invention are described with reference to the figures of the accompanying sheets, in which:

FIGS. 2 to 4 are views of a heat exchange device included in the installation shown in FIG. 1, shown in various respective embodiments.

DETAILED DESCRIPTION OF THE INVENTION

Figure 1:
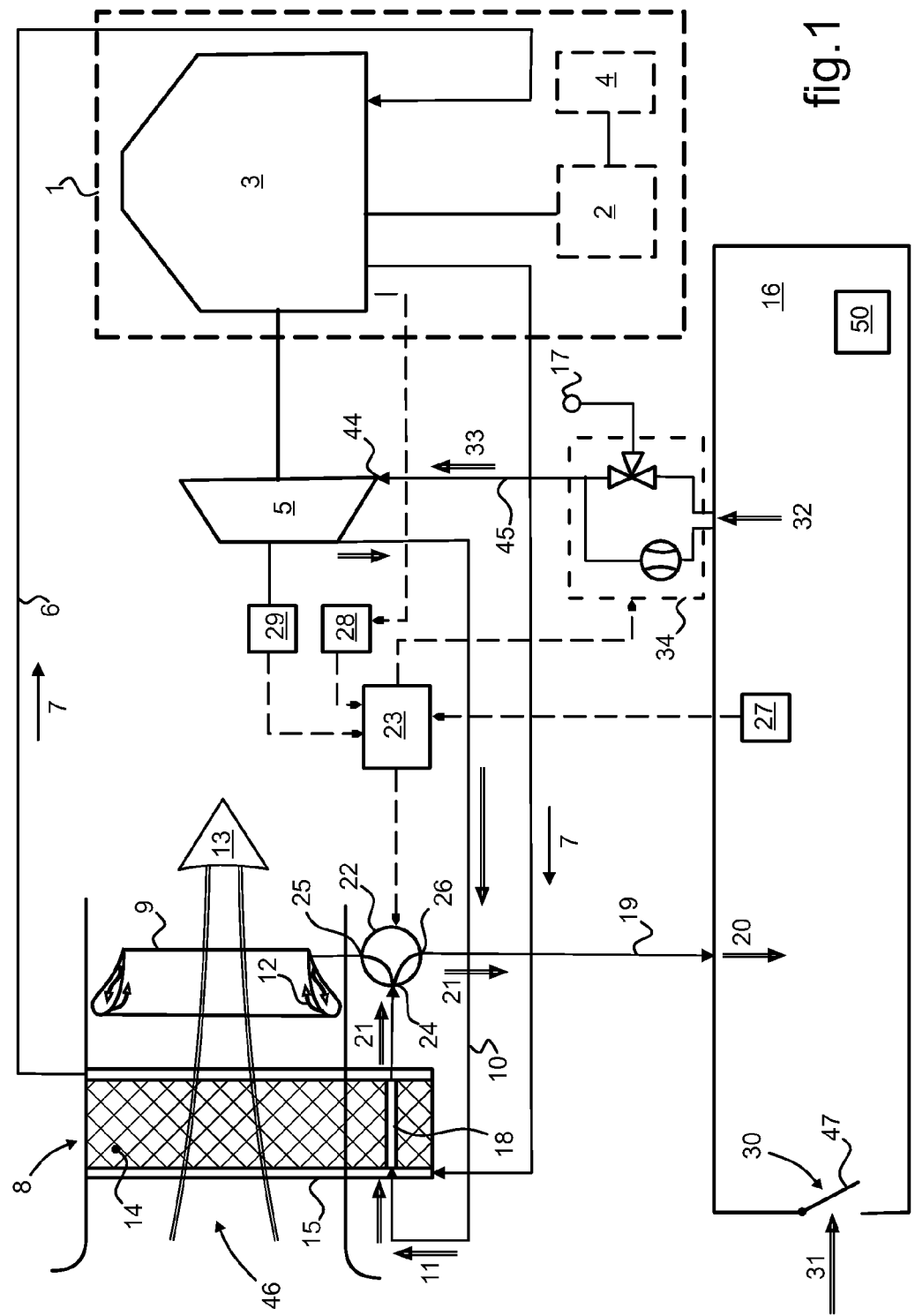
FIG. 1 is a diagrammatic view of a fluid temperature control installation for an aircraft, in particular, a rotorcraft, in a preferred embodiment of the present invention.

In FIG. 1, an aircraft, and more particularly a rotorcraft, is fitted with a main power plant 1 for driving at least one rotor, and is fitted with a fluid temperature control installation. The main power plant 1 has at least one main engine 2 engaged with a main gearbox (MGB) 3. In the example shown, the main engine 2 is a turboshaft engine having a main compressor 4.

An accessory compressor 5 is driven by the MGB 3 and has an air inlet 44 in air-flow communication with a third air circuit 45. The accessory compressor 5 is a member producing the energy needed for operating the entire fluid temperature control installation fitted to the rotorcraft.

The rotorcraft has at least one system for cooling at least one member for cooling, including the main gearbox (MGB) 3. The cooling system comprises:

a closed circuit 6 for circulating a fluid for cooling 7, the closed circuit 6 including at least one heat exchanger 8 fitted with a bladeless ventilator 9; and a first air circuit 10 for conveying a source air stream generated by the accessory compressor 5 and from which there comes an activation air stream 12 for activating bladeless ventilator 9. The activation air stream 12 causes a cooling air stream 13 to be produced that passes through a heat exchange structure 14 included in the heat exchanger 8. The heat exchanger has a first internal circuit 15 through which the fluid for cooling 7 is passed. The heat exchanger 8 has an outside air admission opening 46 from which the cooling air stream is taken. The admission opening 46 is in air-flow communication with the heat exchange structure 14.

The rotorcraft also has at least one temperature control system for controlling the temperature of a cabin 16, and comprising:

a) the accessory compressor 5 fed with an intake air stream 33. The intake air stream 33 comes selectively from the ambient air 32 in the cabin 16 and/or from an air intake 17 outside the cabin, via a selection valve 34 interposed in the third air circuit 45;

b) the first air circuit 10 and the heat exchanger 8 having a second internal circuit incorporated in the heat exchanger passing therethrough. The second internal circuit includes in particular a channel 18 for conveying the source air stream 11; and c) a second air circuit 19 for conveying air 20 for heating the cabin 16. The heating air 20 comes from hot air 21 obtained by the heat exchanger 8 heating the source air stream 11.

The rotorcraft also has a distributor valve 22 operated under the control of control means 23. It should be observed that operation of the selection valve 34 is preferably also under the control of the control means 23.

The distributor valve 22 selectively distributes the source air stream 11, and more specifically the hot air stream 21 to the bladeless ventilator 9 and/or to the second air circuit 19. It should be observed that the cooling system and the temperature control system are associated with each other and that together they include the distributor valve 22, the accessory compressor 5, and the heat exchanger 8 fitted with the bladeless ventilator 9. The distributor valve 22 distributes inversely proportional admissions of the source air stream 11, in particular of the hot air stream 21, to the bladeless ventilator 9 and to said second air circuit 19. The source air stream 11 is admitted to the second air circuit 19 after the source air stream 11 has been heated by the heat exchanger 8, and independently of the intake modes selected for the first air circuit 10 supplying the source air stream 11 from which the activation air stream 12 comes.

More particularly, the distributor valve comprises:

an inlet opening 24 for the hot air stream 21 in the compressed state;

a first outlet opening 25 for the hot air 21 in the compressed state going to the bladeless ventilator 9, within which the expanded hot air 21 forms the activation air stream 12; and a second outlet opening 26 for hot air 21 in the compressed state leading to the second air circuit 19 from which the expanded hot air forms the heating air stream 20.

The control means 23 are preferably automatic control means, operated under the control of various temperature measurement means. These measurement means comprise in particular:

means 27 for measuring the temperature of the ambient air inside the cabin 16;

means 28 for measuring the temperature of the fluid for cooling 7. The temperature of the fluid for cooling 7 is preferably measured as close as possible to the member for cooling, and in particular inside the main gearbox (MGB) 3; and means 29 for measuring the temperature of source air stream 11.

In subsidiary manner, the rotorcraft has a ventilation circuit 30 and one or more independent modules 50 for air conditioning the air in the cabin. The ventilation circuit 30 is constituted in particular by an intake 31 for taking in fresh air from the outside and that is fitted with an automatically-controlled flap 47.

In FIGS. 2 to 4, the installation includes a specific heat exchange device. This heat exchange device comprises a said heat exchanger 8 having dual heat exchange between a said fluid for cooling 7 flowing in a first internal circuit 15 and two distinct air streams 13 and 11.

A first air stream is a cooling air stream 13 passing through a said heat exchange structure 14 incorporated in the heat exchanger 8. A second air stream 11 is a source air stream 11 for heating that flows in a second internal circuit 35 incorporated in the heat exchanger 8. The source second air stream 11 is heated by taking heat from the heat exchange structure 14, itself raised in temperature by the passage of the fluid for cooling 7 through the heat exchanger 8 via the first internal circuit 15.

The heat exchanger 8 incorporates the heat exchange structure 14, the first internal circuit 15 for passing a flow of the fluid for cooling 7, and a second internal circuit 35 for passing a flow of a heat-transfer fluid. Said heat-transfer fluid is constituted in particular by the source air stream 11 generated by a compressor, and more particularly by the accessory compressor 5, or by any other member suitable for causing a stream of air to flow in a circuit. The heat exchanger 8 is fitted with a bladeless ventilator 9.

The source air stream 11 is admitted into the second internal circuit 35 in order to be heated by means of the heat exchange structure 14 using heat taken from the fluid for cooling 7. The hot air stream 21 at the outlet from the heat exchanger 8 is taken by an admission circuit 36 for the hot fluid 21 to an inlet 37 of the bladeless ventilator 9 in order to form the activation air stream 12.

It may be assumed that the fraction of the source air stream 11 from which the activation air stream 12 is formed could be taken from a point upstream of the passage of the source air stream 11 through the heat exchanger 8. The source air stream 11 is taken through the heat exchanger 8 to be cooled. A remaining fraction of the source air stream 11 forms a hot air stream 21 advantageously suitable for use as heating means.

In a general approach for such a heat exchange device, the heat transfer fluid 11 may be any fluid driven through the second internal circuit 35 by any drive apparatus 5, compressor, pump, or analogous member for driving a fluid, in particular in the gaseous state. The admission circuit 36 is preferably fitted with a regulator member 22 for regulating the quantity of fluid used for forming the activation air stream 12, and it is preferably operated under the control of control means 23.

The regulator member 22 may have a plurality of outlet paths for the admitted hot fluid 21, including a path 25 for exhausting the hot fluid 21 to the bladeless ventilator 9, and at least one path 26 for exhausting the hot fluid 21 to any circuit 19 for making use of the hot fluid 21, as shown in FIG. 2.

In FIG. 3, the bladeless ventilator 9 comprises an air ejector 40 of generally conical shape. The bladeless ventilator 9 has two concentric walls providing respectively a first ramp surface 38 for guiding the activation air stream 12 and a second ramp surface 39 for guiding the cooling air stream 13.

In FIG. 4, the bladeless ventilator 9 is made up of a plurality of juxtaposed modules 41, 42. Each module 41, 42 is individually provided with one or more air ejectors 43. The air ejectors 43 are of elongate shape, and they are arranged parallel to one another.

What is claimed is:

1. A fluid temperature control installation for an aircraft, the installation comprising at least one cooling system that requires cooling at least one member for cooling, and at least one temperature control system for controlling the temperature of the air of a cabin of the aircraft;
the cooling system comprising a closed circuit for circulating a fluid for cooling between the member for cooling and at least one heat exchanger fitted with an airflow generator member, the heat exchanger being interposed on the closed circuit by means of an internal circuit for the fluid for cooling, and including a heat exchange structure through which there is passed a stream of cooling air generated by the airflow generator member; and
the air temperature control system comprising a distributor valve for regulating a stream of heating air admitted to the cabin, and an open circuit conveying a plurality of air streams, the open circuit having a first air circuit for conveying a source air stream generated by a compressor to at least one temperature control device, and a second air circuit for conveying to the cabin the stream of heating air from the temperature control of the source air stream;
wherein:
the airflow generator member is a bladeless ventilator generating the cooling air stream from an activation air stream; and wherein
the cooling system and the temperature control system include a group of members in common, comprising at least:
a) the compressor generating a source air stream, the compressor being an accessory compressor provided with an air inlet and driven by a drive member;
b) the heat exchanger comprising co-operating means for cooling the fluid for cooling and for heating the source air stream coming from the accessory compressor, the heating of the source air stream producing a hot air stream by taking heat contributing to cooling the heat exchange structure; and
c) the distributor valve distributes the source air stream selectively: in a first mode solely to the bladeless ventilator thereby forming the activation air stream, in a second mode solely to the cabin thereby forming the heating air stream coming from the hot air stream and in a third mode to both of the bladeless ventilator and the cabin.

2. The installation according to claim 1, wherein the distributor valve is placed on the first air circuit at the outlet from the heat exchanger, the activation air stream coming from the hot air stream formed by the source air stream heated by the heat exchanger.

3. The installation according to claim 1, wherein the distributor valve is a member for temperature controlling fluids selectively between heating the ambient air of the cabin and cooling the fluid for cooling by inversely proportional amounts of the source air stream respectively to the second air circuit and/or to the bladeless ventilator.

4. The installation according to claim 1, wherein the distributor valve is under the control of control means that may equally well be manually controlled and/or automatically controlled, between a mode for temperature control of the cabin in which a major quantity of the source air stream is distributed to the cabin after being heated by the heat exchanger, and a cooling mode in which a major quantity of the source air stream is distributed to the bladeless ventilator.

5. The installation according to claim 4, wherein use of the automatic control means for controlling the distributor valve depends at least on means for measuring the temperature of the fluid for cooling, means for measuring the temperature of the ambient air inside the cabin, and means for measuring the temperature of the source air stream.

6. The installation according to claim 1, wherein the heat exchanger is organized as a dual heat exchange member, including both heat exchange between the fluid for cooling and the stream of cooling air, and also heat exchange between the fluid for cooling and the source air stream.

7. The installation according to claim 6, wherein the heat exchange structure is in air-flow communication with an outside air admission opening, the outside air forming the cooling air stream comes, and has passing therethrough a channel of the first air circuit conveying the source air stream through the heat exchange structure in order to form the hot air stream that is maintained in the compressed state.

8. The installation according to claim 1, wherein the installation is fitted with a heat exchange device comprising the heat exchanger having the heat exchange structure, means for taking heat, and a first internal circuit for conveying a flow of a fluid for cooling, the means for taking heat associating:
a second internal circuit for passing a flow of a heat-transfer fluid coming from the source air stream; and
the bladeless ventilator provided with means for admitting an activation air stream coming from the source air stream.

9. The installation according to claim 8, wherein the activation air stream admission means comprise a regulated admission valve for regulated admission of the source air stream to the bladeless ventilator, the regulated admission valve being constituted by the distributor valve.

10. The installation according to claim 1, wherein the bladeless ventilator comprises at least one module having at least one air ejector of conical shape or elongate shape.

11. The installation according to claim 10, wherein the bladeless ventilator comprises a plurality of juxtaposed independent modules, each module comprising a housing containing an elongate air ejector or housing a plurality of elongate air ejectors arranged in parallel inside the housing.

12. The installation according to claim 1, wherein the air inlet of the accessory compressor is in air-flow communication with a third air circuit included in the open circuit, the third air circuit having a selection valve for selecting suction of an admission air stream by the accessory compressor, the selection valve distributing to the accessory compressor and in inversely proportional quantities a stream of ambient air taken from the cabin and/or a stream of air from outside the cabin.

13. The installation according to claim 12, wherein the selection valve contributes with the distributor valve for regulating the heating air stream, use of the selection valve being under the control of control means.

14. The installation according to claim 1, wherein the accessory compressor is driven from a main gearbox forming part of a main power plant of the aircraft.

15. An aircraft fitted with the installation according to claim 1.

16. The aircraft according to claim 15, wherein the aircraft is a rotorcraft fitted:
   with a main power plant for driving at least one rotor, and comprising at least one engine member engaged with a main transmission from which the accessory compressor is driven;
   with the cooling system for cooling at least one member that requires cooling, including the main gearbox, comprising:
   the closed circuit for circulation of a fluid for cooling incorporating at least the heat exchanger fitted with the bladeless ventilator; and
   the first air circuit for conveying a source air stream generated by the accessory compressor from which the activation air stream is taken;
   with at least the heat exchange system for a cabin, the system comprising:
   a) the accessory compressor fed with air selectively from the ambient air in the cabin and/or from an intake for air outside the cabin via the selection valve;
   b) the first air circuit and the heat exchanger having passing therethrough a channel for conveying the source air stream; and
   c) the second air circuit for conveying heating air coming from hot air obtained by heating the source air stream by means of the heat exchanger; and
   with the selected distributor valve for the source air stream included in the cooling system and the temperature control system in association, the distributor valve distributing inversely proportional admissions of the source air stream to the bladeless ventilator and to the second air circuit after temperature control of the source air stream by the heat exchanger.

* * * * *